Aug. 25, 1959 W. F. NOLDEN ET AL 2,901,276
SOLENOID CONSTRUCTION
Filed Aug. 28, 1953
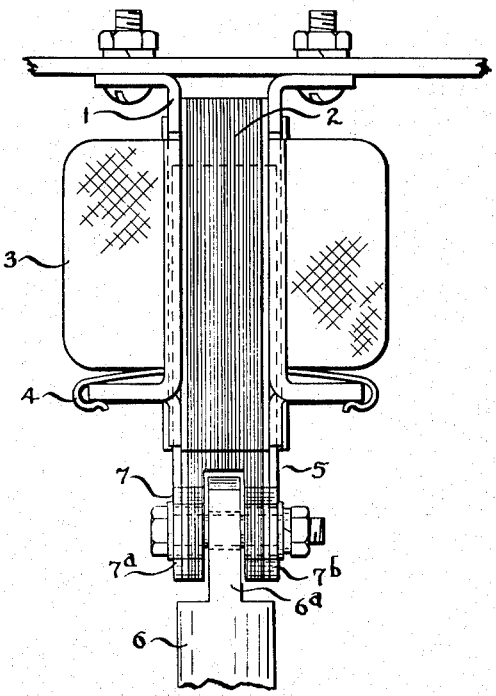
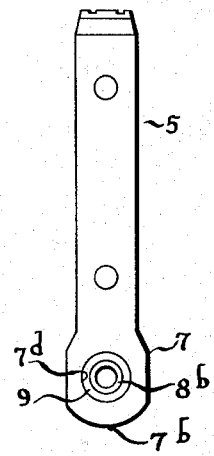
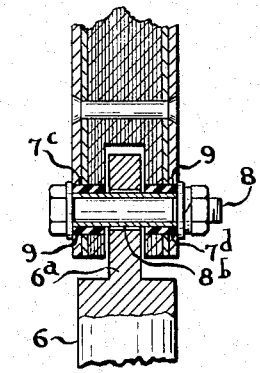
Inventor
William F. Nolden
Edwin W. Seeger
By W. E. Lyon
Attorney

2,901,276

SOLENOID CONSTRUCTION

William F. Nolden, Milwaukee, and Edwin W. Seeger, Wauwatosa, Wis., assignors to Cutler-Hammer, Inc., Milwaukee, Wis., a corporation of Delaware Application August 28, 1953, Serial No. 377,210

6 Claims. (Cl. 287—100)

This invention relates generally to solenoids and more particularly to an improved plunger construction for solenoids adapted to operate a mechanism whereby the useful life of said solenoids may be greatly improved.

In the manufacture of solenoids it has long been a problem to provide a design which will withstand the repeated shocks and stresses occasioned by the force of the plunger movement. Although various means and arrangements have been tried in an effort to minimize the deleterious effects of said shocks and stresses, none has been entirely satisfactory either because of their bulk or their failure to materially improve performance. This problem has been particularly acute with alternating current solenoids. Frequent failures have resulted because of loosening or shearing of the solenoid mounting bolts and plunger pivot screws, peening of the plunger nose, and coil burnouts occasioned by binding of the plunger within its guides. In consequence thereof the trouble-free life of even highest quality solenoids has been found to be much shorter than should be expected.

Accordingly, it is an object of this invention to provide solenoids having a greatly increased useful life.

It is another object of this invention to improve solenoid construction by providing therein novel means for reducing or eliminating the damage incurred during normal operation thereof.

Another object of the invention is to provide an improved solenoid construction without change in size or substantial change in weight.

Another object of the invention is to greatly increase the useful life of solenoids without materially increasing the cost thereof.

The above and other objects and advantages of the invention will appear from the following detailed description when read in connection with the accompanying drawings.

Although the invention has been shown applied to an alternating current type solenoid, it will be obvious to those skilled in the art that it will apply equally well to solenoids of the direct current type.

Referring now to the drawings:

Figure 1 is a front elevational view of a solenoid embodying the invention;

Fig. 2 is a plan view of only the plunger for the solenoid; and

Fig. 3 is a fragmentary sectional view of the plunger showing the details of the load driving connection.

Although double-acting coil springs have long been used to provide a shock absorbing driving connection between a solenoid plunger and its load, their use has never been satisfactory nor have they been found to be completely effective in prolonging solenoid life. Unless exceptional care was taken to proportion these springs to the particular solenoid size and load application, the inherent tendency of the spring turns to compress solid would destroy the limited shock absorbing function provided by the springs. The use of such springs has also been objectionable by reason of their frequent breakage and their relatively considerable bulk.

However, in practicing the present invention a novel form of shock absorbing driving connection is provided between the solenoid plunger and its load. We have found that all of the above-mentioned difficulties can be eliminated by the relatively simple expedient of enlarging the usual pin-receiving openings in a solenoid plunger to provide for the snugly fitted accommodation of resilient centrally apertured members formed of "Neoprene" or other similar material between the pivot pin and the inner faces of said openings. By actual tests we have determined that, for a given load, the useful life of a commercially available solenoid can be increased approximately 5000% by simply modifying it according to our invention. The importance in the solenoid art of this rather spectacular increase in solenoid life is believed to be self-evident.

Referring to the drawing; in Fig. 1 there is shown a solenoid which has been improved according to our invention. It includes a frame 1, an electromagnetic core 2, an energizing winding 3, a spring member 4 adapted to maintain said energizing winding in position, a movable plunger 5 and a load member 6.

Referring also to Figs. 2 and 3, it will be seen that the lower end of the solenoid has a slightly enlarged clevis portion 7 having ends 7$^a$ and 7$^b$. Alined openings 7$^c$ and 7$^d$ are provided in said clevis ends for receiving a clevis pin 8 which also passes through an opening in the tongue portion 6$^a$ of load 6 to effect a driving connection therewith.

The clevis connecting pin 8 comprises a bolt 8$^a$ and a surrounding spacer member 8$^b$. The spacer member is preferably formed of hardened metal to resist wear at its point of contact with the load 6, and serves to prevent drawing together of the clevis ends by the bolt 8$^a$ in addition to providing a smooth bearing surface for the shock-absorbing members which will now be described.

As best illustrated in Fig. 3, each of the openings in the clevis ends is provided with a circumferential resilient insert 9 which is adapted to snugly engage the periphery of the spacer member 8$^b$. The inserts are each retained in place at one end thereof by means of washers supported on the clevis bolt 8 and at the other end thereof by engagement with tongue 6$^a$ of load 6. The material used for inserts 9 must be a resilient rubber-like material having an ability to build up compression very rapidly. A commercially available material known as "Neoprene," grade "N," which material has a durometer reading of 45–50, has been found to provide exceptional results when formed into inserts having a wall thickness slightly in excess of the distance between the face of the clevis opening and the spacer member so as to be placed in slight compression when inserted therebetween.

It thus will be seen that the above-described construction provides a simple and inexpensive way for greatly increasing the useful life of solenoids without otherwise affecting their characteristics. While only one particular construction has been described in detail, it is to be understood that it is for the purpose of illustration only and is not intended as a definition of the scope of the invention, reference being had for this purpose to the appended claims.

We claim:

1. In a solenoid plunger construction, in combination, a plunger member, a load member, a clevis pin driving connection therebetween, said members jointly having a multiplicity of transversely alined openings formed therein, said clevis pin having its end portions positioned within a plurality of openings in one of said members and its intermediate portion positioned within an opening in the other of said members, and shock-reducing means for said plunger member comprising a plurality of members of resilient rubber-like material surrounding the body portion of said clevis pin and confined under a slight degree of compression between said pin and the surrounding walls of said openings in said one member having a plurality of openings.

2. In a solenoid plunger construction, in combination, a reciprocally movable plunger and a load member for movement thereby, said plunger and said load member jointly having a multiplicity of transversely alined openings formed therein, a driving connection between said plunger and said load member comprising a pin transversely mounted on one of said members with its end portions positioned in spaced apart alined openings of substantial depth in said latter member, and a surrounding layer of resilient rubber-like material for resiliently centering each of said end portions in said openings.

3. In a solenoid plunger construction, in combination, a plunger having a plurality of transversely spaced alined openings formed therein, a transversely mounted load driving member having its end portions located within said openings in said plunger, and a shock-reducing connection between said plunger and said load driving member comprising tubular members of resilient rubber-like material positioned under a slight degree of compression between said end portions of said load driving member and the walls of said openings surrounding said end portions.

4. In a solenoid plunger construction, in combination, a plunger member, a load member, a clevis pin driving connection therebetween, said members jointly having a multiplicity of transversely alined openings formed therein, said clevis pin having its end portions positioned within a plurality of openings in one of said members and its intermediate portion positioned within an opening in the other of said members, shock-reducing means for said plunger member comprising a plurality of tubular members of resilient rubber-like material surrounding the body portion of said clevis pin and confined under a slight degree of compression between said pin and the surrounding walls of said openings in said one member having a plurality of openings, and a wear resistant metal member interposed between said body portion of said clevis pin and said tubular members of resilient rubber-like material.

5. In a solenoid plunger construction, in combination, a reciprocally movable plunger and a load member for movement thereby, said plunger and said load member jointly having a multiplicity of transversely alined openings formed therein, a driving connection between said plunger and said load member comprising a clevis pin transversely mounted on one of said members with its end portions positioned in spaced apart alined openings of substantial depth in said latter member, a surrounding layer of resilient rubber-like material for resiliently centering each of said end portions in said openings, and a wear resistant tubular metal member interposed between the body portion of said clevis pin and each of said resiliently centering end portions of rubber-like material.

6. In a solenoid plunger construction, in combination, a plunger having a plurality of transversely spaced alined openings formed therein, a transversely mounted load driving member having its end portions located within said openings in said plunger, means affording a shock-reducing connection between said plunger and said load driving member comprising a plurality of tubular members of resilient rubber-like material positioned under a slight degree of compression between said end portions of said load driving member and the walls of said openings surrounding said end portions, and a wear resistant tubular metal member interposed between the main body portion of said load driving member and the internal surfaces of said tubular members of resilient rubber-like material.

References Cited in the file of this patent

UNITED STATES PATENTS

| | | |
|---|---|---|
| 701,016 | Davies | May 27, 1902 |
| 1,011,662 | Sundh | Dec. 12, 1911 |
| 1,863,370 | Geyer | June 14, 1932 |
| 1,913,513 | Rossman et al. | June 13, 1933 |
| 2,230,414 | Piron | Feb. 4, 1941 |
| 2,480,057 | Soreng et al. | Aug. 23, 1949 |
| 2,598,115 | Dodge | May 27, 1952 |
| 2,632,656 | Balcom | Mar. 24, 1953 |

FOREIGN PATENTS

| | | |
|---|---|---|
| 160,345 | Great Britain | Mar. 24, 1921 |
| 665,171 | Great Britain | Jan. 16, 1952 |